(12) United States Patent
Makino et al.

(10) Patent No.: US 11,748,863 B2
(45) Date of Patent: Sep. 5, 2023

(54) IMAGE MATCHING APPARATUS, IMAGE MATCHING METHOD, AND PROGRAM

(71) Applicant: NEC Corporation, Tokyo (JP)

(72) Inventors: Kengo Makino, Tokyo (JP); Rui Ishiyama, Tokyo (JP); Toru Takahashi, Tokyo (JP); Yuta Kudo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 168 days.

(21) Appl. No.: 17/296,048

(22) PCT Filed: Nov. 30, 2018

(86) PCT No.: PCT/JP2018/044265
§ 371 (c)(1),
(2) Date: May 21, 2021

(87) PCT Pub. No.: WO2020/110309
PCT Pub. Date: Jun. 4, 2020

(65) Prior Publication Data
US 2022/0020129 A1    Jan. 20, 2022

(51) Int. Cl.
*G06T 5/50*    (2006.01)
*G06V 10/44*    (2022.01)
*G06V 10/60*    (2022.01)

(52) U.S. Cl.
CPC .............. *G06T 5/50* (2013.01); *G06V 10/443* (2022.01); *G06V 10/60* (2022.01); *G06T 2207/20224* (2013.01)

(58) Field of Classification Search
CPC ... G06T 5/50; G06T 2207/20224; G06T 7/00; G06V 10/443; G06V 10/60; G06V 10/753; G06V 10/431
See application file for complete search history.

(56) References Cited

U.S. PATENT DOCUMENTS 6,081,618 A * 6/2000 Naoi ................ G06V 30/18076
382/180
6,549,650 B1 * 4/2003 Ishikawa .............. H04N 13/305
348/E13.044
(Continued)

FOREIGN PATENT DOCUMENTS

JP    H11-003423 A    1/1999
JP    2004-272859 A    9/2004
(Continued)

OTHER PUBLICATIONS

International Search Report for PCT Application No. PCT/JP2018/044265, dated Feb. 19, 2019.
(Continued)

*Primary Examiner* — Xuemei G Chen

(57) ABSTRACT

An image matching apparatus according to the present invention includes: a common region specification unit configured to specify a common region between a first image and a second image; a date replacement unit configured to generate a first replaced image in which a brightness value of the common region of the first image is replaced based on a pixel in the first image, and a second replaced image in which a brightness value of the common region of the second image is replaced based on a pixel in the second image; and a matching unit configured to perform matching between the first image and the second image based on frequency characteristics of the first replaced image and the second replaced image.

15 Claims, 16 Drawing Sheets

(56) References Cited

U.S. PATENT DOCUMENTS

| | | | |
|---|---|---|---|
| 11,044,404 B1* | 6/2021 | Persiantsev | H04N 5/247 |
| 2008/0151324 A1* | 6/2008 | Shimizu | G07D 7/128 |
| | | | 358/474 |
| 2012/0121202 A1* | 5/2012 | Wang | H04N 5/23277 |
| | | | 382/255 |
| 2012/0154520 A1* | 6/2012 | Putraya | H04N 1/3876 |
| | | | 348/E7.001 |
| 2012/0194883 A1* | 8/2012 | Yamanaka | G06V 30/18086 |
| | | | 358/530 |
| 2012/0201461 A1* | 8/2012 | Yamanaka | G06V 30/168 |
| | | | 382/182 |
| 2012/0243797 A1 | 9/2012 | Di Venuto Dayer et al. | |
| 2014/0118529 A1* | 5/2014 | Zheng | G21K 7/00 |
| | | | 348/80 |
| 2015/0036038 A1* | 2/2015 | Horstmeyer | G02B 21/006 |
| | | | 348/360 |
| 2017/0004346 A1* | 1/2017 | Kim | G06V 40/1335 |
| 2018/0035047 A1* | 2/2018 | Lei | H04N 5/265 |
| 2019/0287266 A1 | 9/2019 | Takahashi | |

FOREIGN PATENT DOCUMENTS

| | | |
|---|---|---|
| JP | 2007-078511 A | 3/2007 |
| JP | 2014-078110 A | 5/2014 |
| JP | 2015-176433 A | 10/2015 |
| WO | 2018/100669 A1 | 6/2018 |

OTHER PUBLICATIONS

Kengo Makino et al., "Fast Image Matching and Feature Value Reduction Based on Correlation of Fourier-Mellin Features", MIRU2018, OS3-L1, Aug. 2018.

Toru Takahashi et al., "A Study of Fast Image Matching Method Under Translation, Scale and Rotation", IEICE technical report, vol. 117, No. 514, pp. 37-42, Mar. 18, 2018.

IB345 and PCT Administrative Instructions Part 8.

* cited by examiner

Fig.7
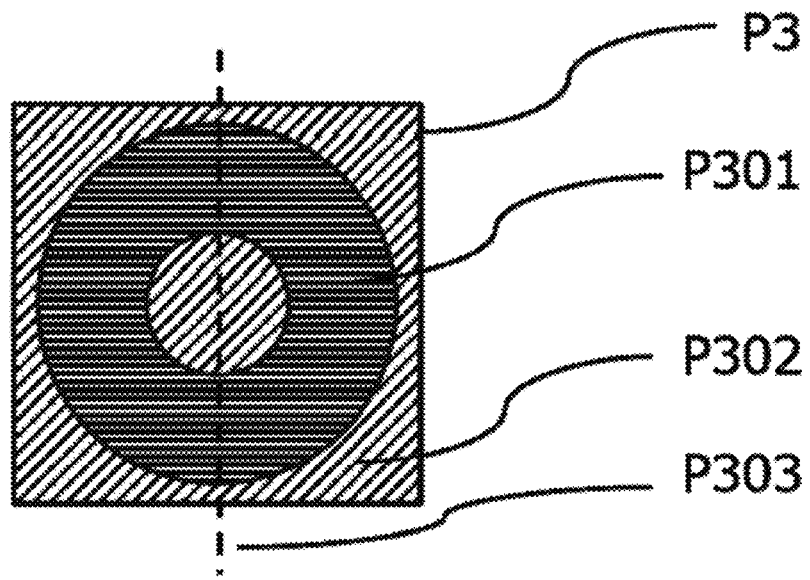
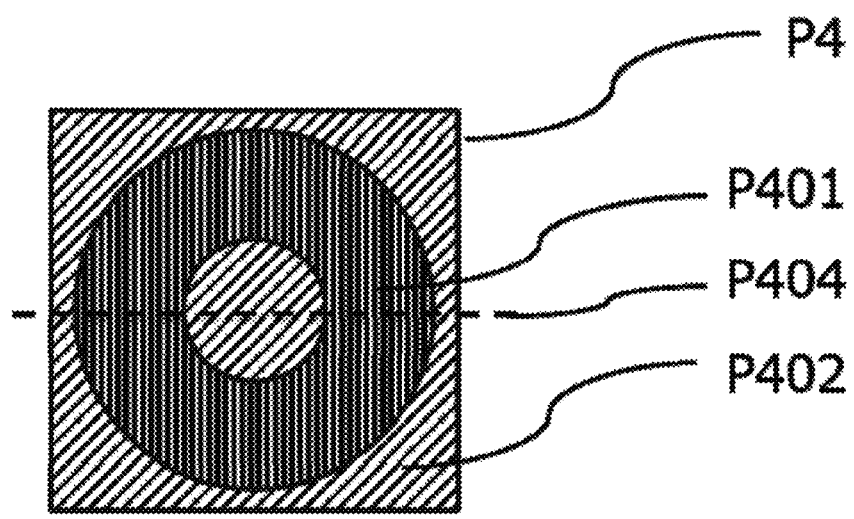

Fig.14

$$F(k_1, k_2) = \sum_{n_1, n_2} f(n_1, n_2) W_{N_1}^{k_1 n_1} W_{N_2}^{k_2 n_2}$$
$$= A_F(k_1, k_2) e^{j\theta_F(k_1, k_2)} \quad \cdots \cdots (1)$$

$$G(k_1, k_2) = \sum_{n_1, n_2} g(n_1, n_2) W_{N_1}^{k_1 n_1} W_{N_2}^{k_2 n_2}$$
$$= A_G(k_1, k_2) e^{j\theta_G(k_1, k_2)} \quad \cdots \cdots (2)$$

$$W_{N_1} = e^{-j\frac{2\pi}{N_1}} \quad \cdots \cdots \cdots \cdots (3)$$

$$W_{N_2} = e^{-j\frac{2\pi}{N_2}} \quad \cdots \cdots \cdots \cdots (4)$$

$$\sum_{n_1, n_2} = \sum_{n_1 = -M_1}^{M_1} \sum_{n_2 = -M_2}^{M_2} \quad \cdots \cdots \cdots (5)$$

IMAGE MATCHING APPARATUS, IMAGE MATCHING METHOD, AND PROGRAM

This application is a National Stage Entry of PCT/JP2018/044265 filed on Nov. 30, 2018, the contents of all of which are incorporated herein by reference, in their entirety.

TECHNICAL FIELD

The present invention relates to an image matching apparatus, an image matching method, and a program.

BACKGROUND ART

Various image matching methods for matching a matched image against a registered image are proposed or put into practical use for the purpose of individual identification, and so on. Meanwhile, a matched image and a registered image may include variations in translation, rotation and scale of an object shown in the images, and an image matching method that meets these variations is required. For such image matching, there is a method in which phase-only correlation is applied.

Patent Document 1 describes a method of estimating a geometrical variation between a matched image and a registered image, geometrically correcting so that one of the images is aligned with the other, and then performing a correlation calculation between the images (an image correlation based method). To be specific, after the Fourier transform is performed on a matched image and a registered image and amplitude components are extracted, respectively, the amount of scale variation and the amount of rotational variation of the original matched image with respect to the registered image are estimated based on the result of a correlation calculation between the amplitude components. Then, the matched image is geometrically corrected using the obtained amount of scale variation and the obtained amount of rotational variation. Finally, a phase-only correlation calculation between the geometrically corrected matched image and the registered image is performed, and the result of matching is determined based on the result of a correlation value.

Further, Non-Patent Document 1 describes a method of performing the Fourier transform on a matched image and a registered image, respectively, and performing a correlation calculation between the amplitude components thereof (an amplitude correlation based method). To be specific, after the Fourier transform is performed on a matched image and a registered image and amplitude components are extracted, respectively, the amplitude components are subject to coordinate transformation by logarithmic polar coordinate transformation so that a correlation calculation between the amplitude components can be efficiently executed. Then, a phase-only correlation calculation between the amplitude components after the coordinate transformation is performed, and the result of matching is determined based on the result of a correlation value. As described in Non-Patent Document 1, the amplitude correlation based method enables matching without the need for estimation of the amount of geometric variation or geometric correction. Therefore, there is an advantage that fast matching can be performed in one-to-N matching by which one matched image is matched against N registered images.

Patent Document 1: Japanese Unexamined Patent Application Publication No. JP-A 2004-272859

Non-Patent Document 1: Kengo Makino, Toru Takahashi, Yuta Kudo, and Rui Ishiyama, "Fast Image Matching and Feature Value Reduction Based on Correlation of Fourier-Mellin Features", MIRU2018, OS3-L1, August 2018

Non-Patent Document 2: Tom Takahashi, Yuta Kudo, Kengo Makino, and Rui Ishiyama, "A Study of Fast Image Matching Method Under Translation, Scale and Rotation", IEICE vol. 117, no. 514, PRMU2017-178, pp 37-42, March 2018

In a case where two original images of a certain identical individual contain a common pattern part (a common region) that does not have an individual difference from a different individual and a random irregularity pattern part (a unique region) that has an individual difference varies in translation, rotation and scale, when matching is performed by the image correlation based method, there is a problem that a correlation in common region portion is lost and a matching score is decreased. In order to solve this problem, a masking process is generally performed such as replacing the brightness value of the common region portion with another fixed value and then performing a correlation calculation. Such a masking process is effective for a method using an original image for matching.

However, when the replacement of the brightness value of the common region portion is performed in the amplitude correlation based method, there is a problem that noise is generated in amplitude components depending on the replaced value and decrease of a matching score is caused. This is due to a phenomenon relevant to Fourier series expansion called the Gibbs phenomenon, which occurs in a case where the brightness values of adjacent pixels are discontinuous at the time of transforming from an original image to amplitude components.

The Gibbs phenomenon is a phenomenon that in the Fourier series of a function having a discontinuous point, the partial sum of the series does not converge to the original function in the vicinity of the discontinuous point even if a higher-order harmonic is used. In other words, the existence of the discontinuous point contributes to a higher-order Fourier coefficient because of the approximation of the function.

Further, in a case where, at the time of performing the Fourier transform from an original image to amplitude components, a difference (a jump) d in brightness value between adjacent pixels as a result of the masking process, a signal irrelevant to a signal of the original image appears even in a high-frequency component region of the amplitude components due to the Gibbs phenomenon.

In the amplitude correlation based method, the signal irrelevant to the signal of the original image as described above behaves as noise and decreases a matching score. As a result, it becomes difficult to make a difference in matching score between an identical individual and a different individual, and it becomes difficult to ensure the accuracy of matching.

In the amplitude correlation based method, it is general, instead of simply using amplitude components obtained from an original image for a correlation calculation, to perform a correlation calculation after performing a filtering process such as suppressing low frequency components with low individual identification and enhancing high frequency components with high individual identification.

For example, when the values of amplitude components are logarithmized, low-frequency components that are abundantly contained in an image are strongly suppressed because they have large values as the amplitude components, and high-frequency components that are not so much contained in the image are not suppressed much as compared with the low-frequency components because they have small values as the amplitude components. As a result, since the high-frequency components are relatively enhanced, a signal of the high-frequency components with high individual identification becomes dominant, and the accuracy of individual identification can be increased. Another method is to relatively enhance high-frequency components by applying a predefined high-pass filter to the amplitude components, for example.

However, the signal enhancement by the filtering process as described above is based on an ideal condition that noise is not added to high-frequency components. For this reason, when a signal irrelevant to an original signal is generated in high-frequency components due to the Gibbs phenomenon, the irrelevant signal is enhanced as noise, so that the matching score between identical individuals becomes lower than in an ideal state, and the accuracy of individual identification may be rather lowered.

SUMMARY

Accordingly, an object of the present invention is to provide an image matching apparatus, an image matching method and a program that can solve the abovementioned problem of decrease in accuracy of matching between images containing a common region.

An image matching apparatus according to an aspect of the present invention includes: a common region specification unit configured to specify a common region between a first image and a second image; a date replacement unit configured to generate a first replaced image in which a brightness value of the common region of the first image is replaced based on a pixel in the first image, and a second replaced image in which a brightness value of the common region of the second image is replaced based on a pixel in the second image; and a matching unit configured to perform matching between the first image and the second image based on frequency characteristics of the first replaced image and the second replaced image.

Further, a computer program according to another aspect of the present invention includes instructions for causing an image information apparatus to realize: a common region specification unit configured to specify a common region between a first image and a second image; a date replacement unit configured to generate a first replaced image in which a brightness value of the common region of the first image is replaced based on pixels in the first image, and a second replaced image in which a brightness value of the common region of the second image is replaced based on pixels in the second image; and a matching unit configured to perform matching between the first image and the second image based on frequency characteristics of the first replaced image and the second replaced image.

Further, an image matching method according to another aspect of the present invention includes: specifying a common region between a first image and a second image; generating a first replaced image in which a brightness value of the common region of the first image is replaced based on pixels in the first image, and a second replaced image in which a brightness value of the common region of the second image is replaced based on pixels in the second image; and performing matching between the first image and the second image based on frequency characteristics of the first replaced image and the second replaced image.

With the configurations as described above, the present invention can increase the accuracy of matching between images containing a common region.

BRIEF DESCRIPTION OF DRAWINGS

FIG. 7 is a schematic view showing a first image and a second image for describing a brightness value estimation method;

FIG. 14 is a view showing an example of equations showing a frequency characteristic of the first image and a frequency characteristic of the second image;

EXAMPLE EMBODIMENTS

First Example Embodiment

A first example embodiment of the present invention will be described with reference to FIGS. 1 to 14. An image matching apparatus according to the present invention is composed of one or a plurality of information processing apparatuses each including an arithmetic logic unit and a memory unit as will be described later. The image matching apparatus 100 is configured to perform matching between a first image and a second image as will be described later.

Figure 1:
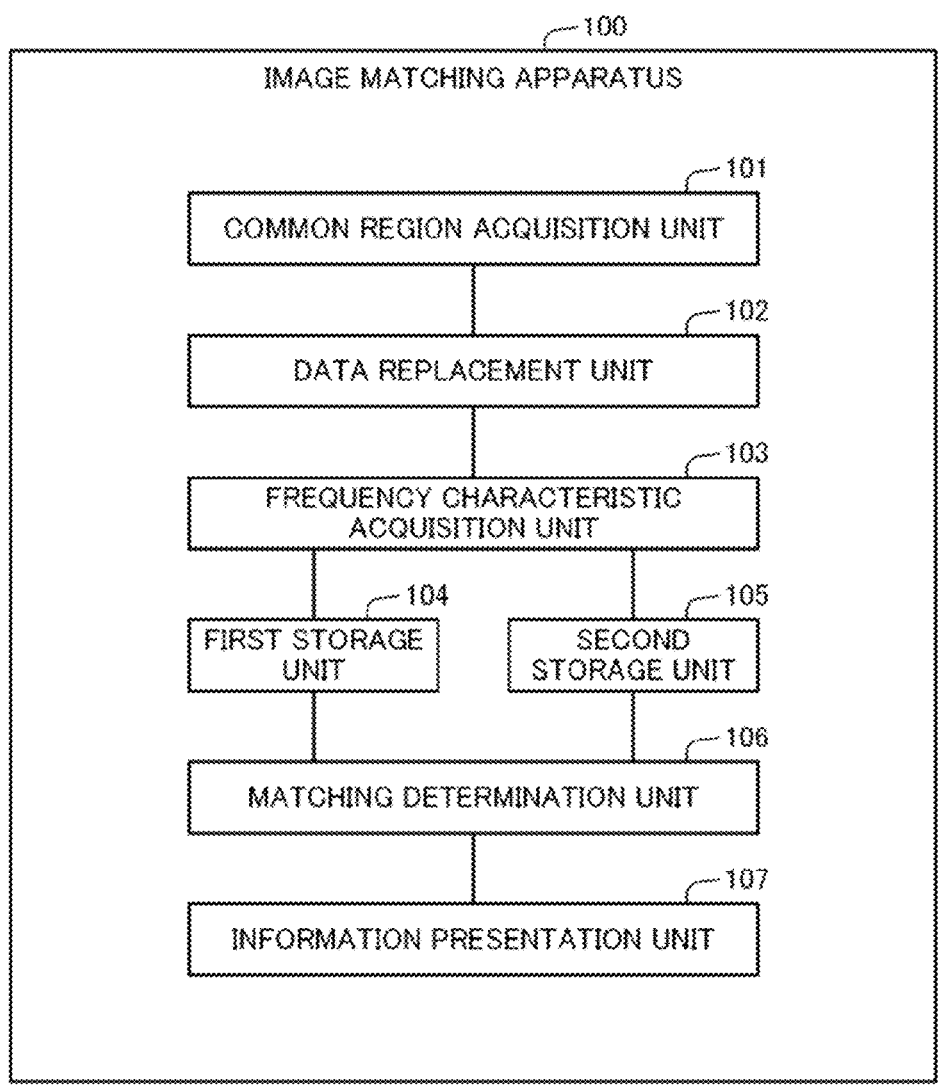
FIG. 1 is a view showing the configuration of an image matching apparatus according to a first example embodiment of the present invention.

FIG. 1 is a block diagram of the image matching apparatus according to the first example embodiment of the present invention. As shown in this diagram, the image matching apparatus 100 includes a common region acquisition unit 101, a data replacement unit 102, a frequency characteristic acquisition unit 103, a matching determination unit 106, and an information presentation unit 107. Moreover, the image matching apparatus 100 includes a first storage unit 104 and a second storage unit 105 that are formed in the memory unit.

The common region acquisition unit 101 is configured to acquire a common region between a first image and a second image. The common region refers to the set of pixels that do not have individual identification, or the set of pixels that are not used for individual identification.

Figure 2:
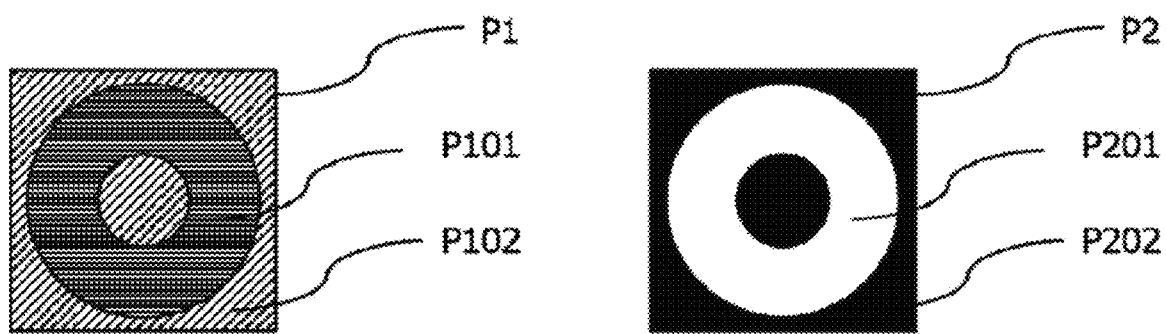
FIG. 2 is a schematic view showing an example of an image and a mask image corresponding thereto.

The common region can be expressed by, for example, storing a value indicating whether or not to be the common region for each of the pixels of an image in an array having the same vertical and horizontal dimensions as the image. Hereinafter, an array showing the common region will be referred to as a mask image. In a more specific example of a mask image, the pixel value of the unique region is 255, and the pixel value of a common region is 0. FIG. 2 is a schematic view for showing a specific example of the mask image. In FIG. 2, reference numeral P1 denotes an example of an image to be matched, and reference numeral P2 denotes an example of a mask image corresponding to the image P1.

The data replacement unit 102 is configured to acquire the image and the mask image, and replace the pixel values of an image corresponding to the common region with an appropriate value with reference to the pixel values of an image corresponding to the unique region. The unique region is a region different from the abovementioned common region in each of the first image and the second image, and is the set of pixels having individual identification.

The frequency characteristic acquisition unit 103 is configured to receive a first replaced image and a second replaced image in each of which the common region has been replaced by the data replacement unit 102, and acquire frequency characteristics of the first replaced image and the second replaced image. The frequency characteristic refers to two-dimensional data (a two-dimensional array) that is the result of performing the Fourier transform (the discrete Fourier transform) on an image and thereby transforming the image into a frequency domain.

The first storage unit 104 is configured so that the frequency characteristic of the first image is stored. The second storage unit is configured so that the frequency characteristic of the second image is stored.

The matching determination unit 106 is configured to perform a correlation calculation using the frequency characteristic of the first image and the frequency characteristic of the second image, and determine the result of matching.

The information presentation unit 107 is configured to present the result of matching between the first image and the second image based on the result of determination by the matching determination unit 106. The matching result may be presented by displaying the matching result on a display device, or printing out a sheet of paper on which the matching result is described by a printing device, or transmitting a message in which the matching result is described to an external terminal by a communication device.

Figure 3:
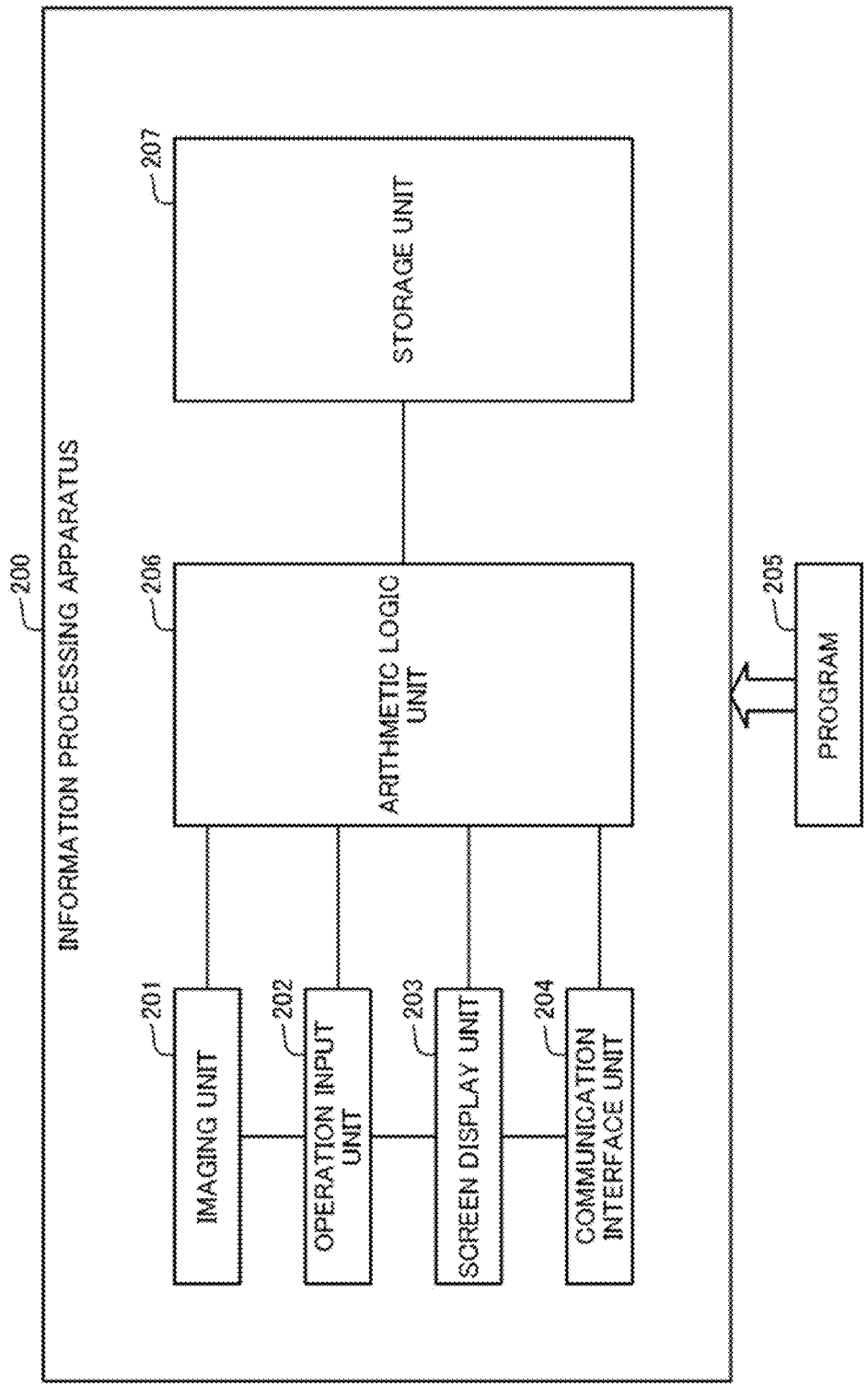
FIG. 3 is a block diagram showing an example of the hardware configuration of the image matching apparatus according to the first example embodiment of the present invention.

The image matching apparatus 100 described above can be realized by, for example, as shown in FIG. 3, an information processing apparatus 200 and a program 207. The information processing apparatus 200 has an imaging unit 201 such as a camera, an operation input unit 202 such as a keyboard and a mouse, a screen display unit 203 such as a liquid crystal display, a communication interface unit 204, a storage unit 205 such as a memory and a hard disk, and an arithmetic logic unit 206 such as one or more microprocessors. The information processing apparatus 200 may be, for example, a personal computer or a smartphone.

Further, the program 207 is loaded into the memory from an external computer-readable storage medium when, for example, the information processing apparatus 200 is started, and controls the operation of the arithmetic logic unit 206 to realize functional units on the arithmetic logic unit 206, such as the common region acquisition unit 101, the data replacement unit 102, the frequency characteristic acquisition unit 103, the matching determination unit 106, and the information presentation unit 107.

Figure 4:
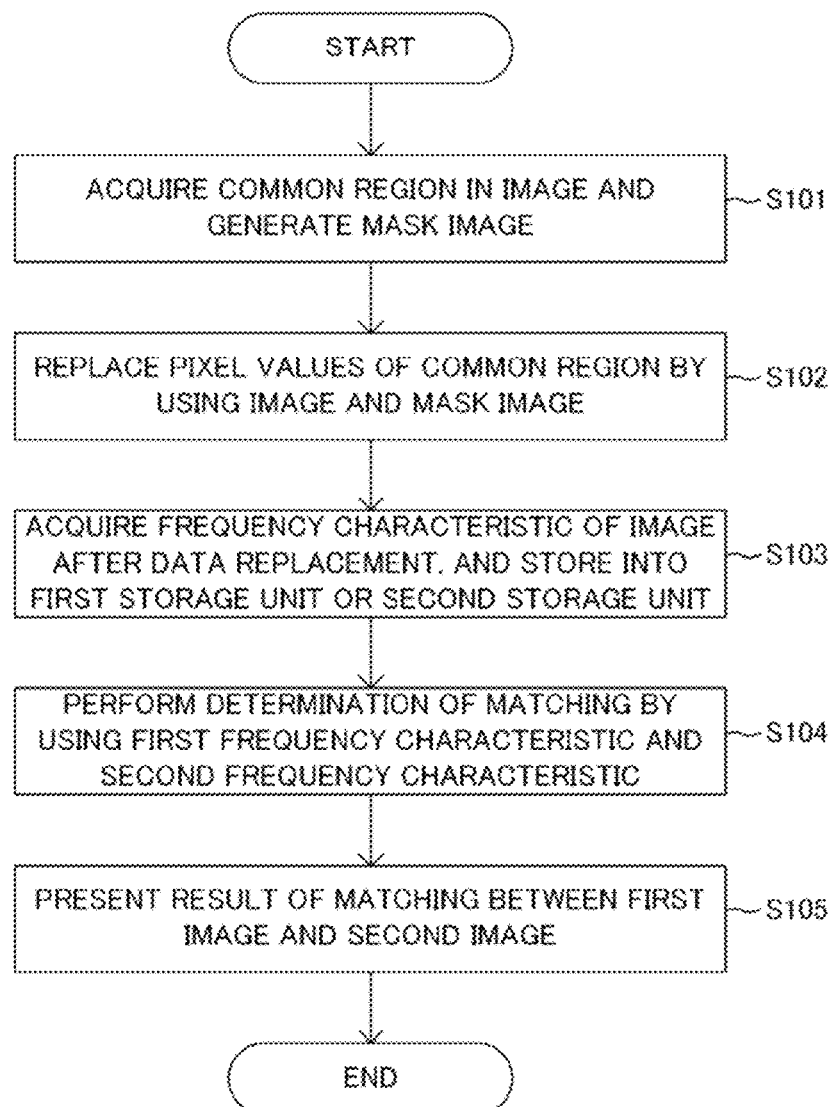
FIG. 4 is a flowchart showing the overview of the operation of the image matching apparatus according to the first example embodiment of the present invention.

Next, the overview of the operation of the image matching apparatus 100 according to this example embodiment will be described. FIG. 4 is a flowchart showing the overview of a matching process of the operation of the image matching apparatus 100 according to the first example embodiment of the present invention.

First, the common region acquisition unit 101 acquires a common region in an image and generates a mask image (step S101). Next, the data replacement unit 102 replaces the pixel values of the common region by using the image and the mask image (step S102). Next, the frequency characteristic acquisition unit 103 acquires the frequency characteristic of an image after data replacement, and stores the frequency characteristic into the first storage unit 104 or the second storage unit 105 (step S103).

Next, the matching determination unit 106 performs a correlation calculation between a first frequency characteristic stored in the first storage unit 104 and a second frequency characteristic stored in the second storage unit 105, and determines the result of matching (step S104). Next, the information presentation unit 107 presents the result of matching between a first image and a second image obtained from the matching determination unit 106 (step S105).

Figure 5:
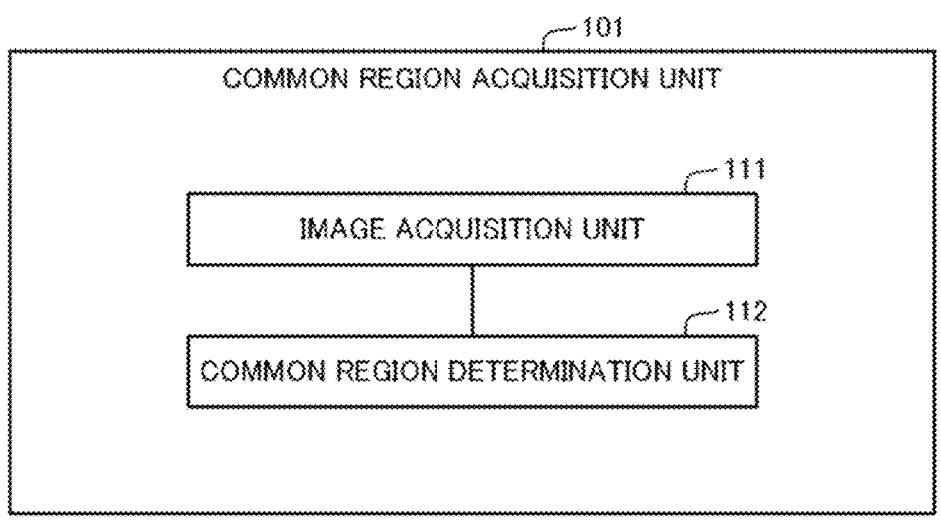
FIG. 5 is a block diagram showing an example a common region acquisition unit in the image matching apparatus according to the first example embodiment of the present invention.

Next, the respective units of the information matching apparatus 100 according to this example embodiment will be described in detail. First, the common region acquisition unit 101 will be described in detail. FIG. 5 is a block diagram showing an example of the common region acquisition unit 101. The common region acquisition unit 101 shown in this example includes an image acquisition unit 111 and a common region determination unit 112.

The image acquisition unit 111 is configured to acquire a first image and a second image. The image acquisition unit 111 acquires the first image and the second image from imaging equipment such as a camera and a scanner, for example. Alternatively, the image acquisition unit 111 may acquire the first image and the second image from an optical sensor that collects visible light and light including near-infrared light, short-wavelength infrared light and thermal infrared light that have longer wavelengths than visible light with a lens and acquires a target object shape and so on as image data. Alternatively, the image acquisition unit 111 may acquire the first image and the second image from a sensor that acquires the intensity of infrared light, ultraviolet light and X-rays and outputs as a two-dimensional data array. Alternatively, the image acquisition unit 111 may be configured to acquire the first image and the second image from an external storage medium such as a CD-ROM or a memory. Alternatively, the image acquisition unit 111 may be configured to receive the first image and the second image via a network. Besides, the image acquisition unit 111 may acquire the first image and the second image by different methods.

The common region determination unit 112 is configured to receive the first image and the second image from the image acquisition unit 111, determine pixels corresponding to the common region in each of the images, and output a mask image for showing the common region.

As a method for determining the common region, for example, the foreground/background segmentation technique, which is generally used, can be applied. More specifically, for example, the shape detection technique can be used. In a case where the shape of a unique region is known in advance and can be expressed by a geometric figure such as a circular shape, the unique region can be determined by the shape detection technique. More specifically, for example, in a case where the shape of a unique region can be expressed by a circle, it is possible to apply circle detection using the Hough transform.

In addition, for example, the background subtraction technique can be used as a method for determining the common region. In a case where an image shown in a background region is always fixed such as a case where an object is placed on a fixed background and imaged, it is possible to determine the background region and a unique region by previously storing the background in a computer as a background image and taking the difference between the first image or the second image and the background image.

In addition, a region division technique using a technique called GraphCut or a region division technique by machine learning may be applied as a method for determining the common region.

Then, based on the result of determination of the common region, the common region determining unit 112 can generate a mask image by storing values indicating whether to be the common region for the respective pixels of the image in an array of the same vertical and horizontal dimensions as the image. FIG. 2 is a schematic view showing an example of an image P1 and a mask image P2 corresponding thereto. In the image P1 and the mask image P2, reference numerals P101 and P201 denote unique region portions, and reference numerals P102 and P202 denote common region portions.

Figure 6:
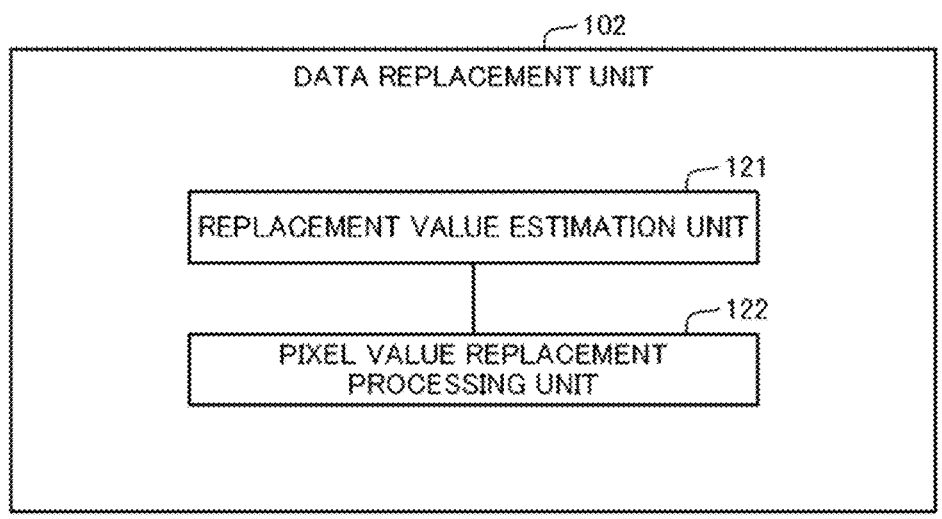
FIG. 6 is a block diagram showing an example of a data replacement unit in the image matching apparatus according to the first example embodiment of the present invention.

Next, the data replacement unit 102 will be described in detail. FIG. 6 is a block diagram showing an example of the date replacement unit 102. The data replacement unit 102 shown in this example includes a replacement value estimation unit 121 and a pixel value replacement processing unit 122.

The replacement value estimation unit 121 is configured to acquire a first image and a mask image corresponding to the first image and acquire a second image and a mask image corresponding to the second image. After acquiring the image and the mask image, the replacement value estimation unit 121 can refer to the pixel values of a unique region in the image based on the respective pixel values of the mask image. Then, the replacement value estimation unit 121 estimates a brightness value appropriate for a masking process on a common region, by using all or some of the pixel values of the unique region in the image. The brightness value appropriate for the masking process refers to, as will be described later, a brightness value that does not cause a difference (a jump) d in brightness value between adjacent pixels after the masking process.

In order to describe a method for estimating a brightness value, how the execution of a general masking process affects amplitude components and affects a matching result will be described first. FIG. 7 is a schematic view showing a first image and a second image. Reference numeral P3 in FIG. 7 denotes the first image. Reference numeral P301 in FIG. 7 denotes a unique region in the first image, and reference numeral P302 denotes a common region in the first image. Reference numeral P4 in FIG. 7 denotes a second image. Reference numeral P401 in FIG. 7 denotes a unique region in the second image, and reference numeral P402 denotes a common region in the first image.

In the example of FIG. 7, the common region P302 of the first image P3 and the common region P402 of the second image P4 have a common pattern in the same direction. The unique region P301 of the first image P3 and the unique region P401 of the second image P4 have the same pattern in different directions.

In image matching, it is desirable to perform matching by using only the brightness value of a unique region. However, in the case of the amplitude correlation based method, there is a need to perform the Fourier transform on an image to extract amplitude components, and therefore, there is a need to use all the pixel values of the image. In other words, in a case where a masking process is not executed particularly, the brightness value of a common region, which contributes as noise at the time of matching, is also included as information in amplitude components.

For a description of the above, pixels on dotted lines denoted by reference numerals P303 and P403 in FIG. 7 are extracted for one line from the first image and for one line from the second image, respectively, and a description is given in one dimension. For a description hereinafter, the extracted pixels are referred to as a first profile and a second profile, respectively.

Figure 8:
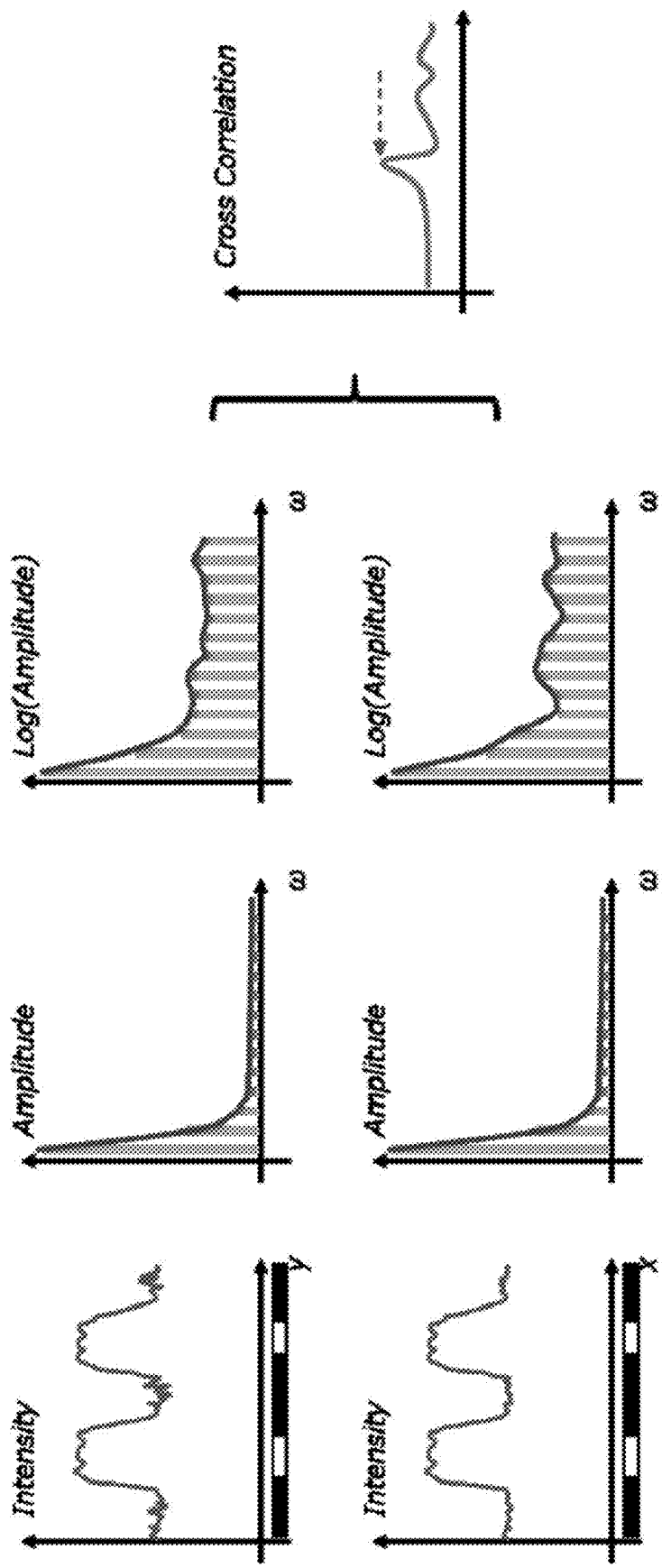
FIG. 8 is a schematic view for describing a correlation calculation using amplitude components of a first profile and a second profile.

FIG. 8 is a schematic view for describing a correlation calculation using the amplitude components of the first profile and the second profile. On the upper side of FIG. 8, a graph of the first profile, a graph of the amplitude components of the first profile, and a logarithmic graph of the amplitude components of the first profile are shown from the left. On the lower side of FIG. 8, a graph of the second profile, a graph of the amplitude components of the second profile, and a logarithmic graph of the amplitude components of the second profile are shown from the left. By logarithmizing the amplitude components, a decrease in value of the amplitude components is differentiated between low-frequency components with large values of the amplitude components and high-frequency components with small values of the amplitude components, and consequently, the high-frequency components can be relatively enhanced. Hereinafter, the amplitude component of the profile will be simply referred to as an amplitude component. Moreover, a logarithmized amplitude component is referred to as an enhanced amplitude component. On the right side in FIG. 8, a cross correlation function between a first enhanced amplitude component and a second enhanced amplitude component is shown, and the maximum value thereof is indicated by a broken line arrow.

In FIG. 8, the graphs of the first profile and the second profile are each provided with an indicator below the horizontal axis for description in one dimension. This indicator shows the pixel values of a mask image extracted in the same manner as when the first profile and the second profile are extracted, and corresponds to a mask image at the time of description in one dimension. That is to say, the indicator shows that a pixel of black in the indicator is a common region and a pixel of white is a unique region.

In FIG. 8, the first profile and the second profile each include a unique region and a common region. The unique regions of the first profile and the second profile have the same pattern and similar signals are obtained. The common regions of the first profile and the second profile have different patterns from each other, and mutually different signals are obtained. That is to say, in the first profile and the second profile, similar signal parts and different signal parts are mixed. When the first profile and the second profile are subject to the Fourier transform and transformed into amplitude components, respectively, the signals of the common regions are added as noise to the values of the amplitude components. Moreover, at the time of transforming the amplitude components into enhanced amplitude components, the noise is further enhanced. Therefore, when a correlation calculation is performed between the first enhanced amplitude components and the second enhanced amplitude components, the maximum value of a cross-correlation function becomes a small value due to the signals of the common regions.

Figure 9:
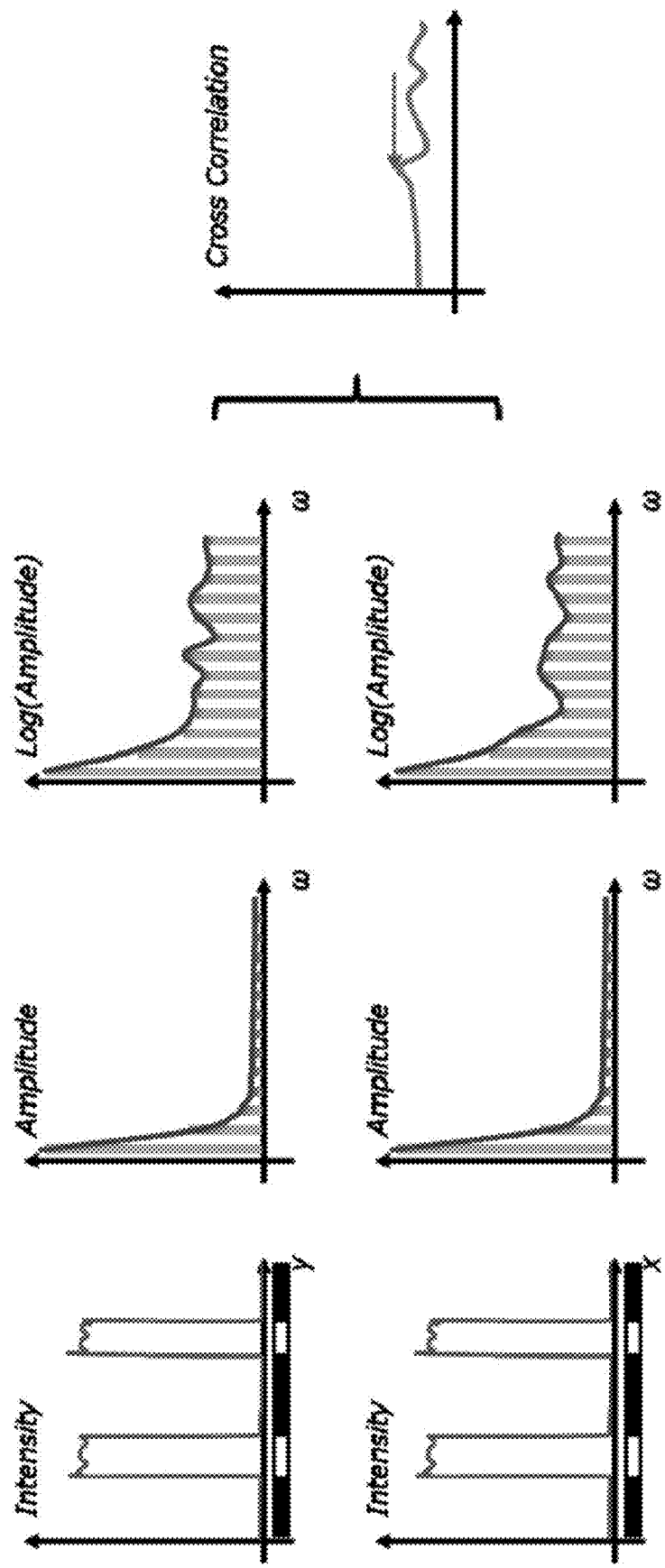
FIG. 9 is a schematic view of a case where common region portions of the first profile and the second profile of FIG. 8 are replaced with 0 by a simple masking process.

FIG. 9 is a schematic view of a case where common region portions of the first profile and the second profile of FIG. 8 are replaced with 0 by a simple masking process. In a case where the simple masking process is performed, a jump d is generated at the boundary between the unique region and the common region and, due to the Gibbs phenomenon, a signal irrelevant to the signal of the unique region is added as noise to high-frequency components of the amplitude components. Therefore, as in a case where the masking process is not performed, when a correlation calculation is performed between the first enhanced amplitude components and the second enhanced amplitude components, the maximum value of a cross-correlation function becomes a small value due to the Gibbs phenomenon caused by the masking process.

Figure 10:
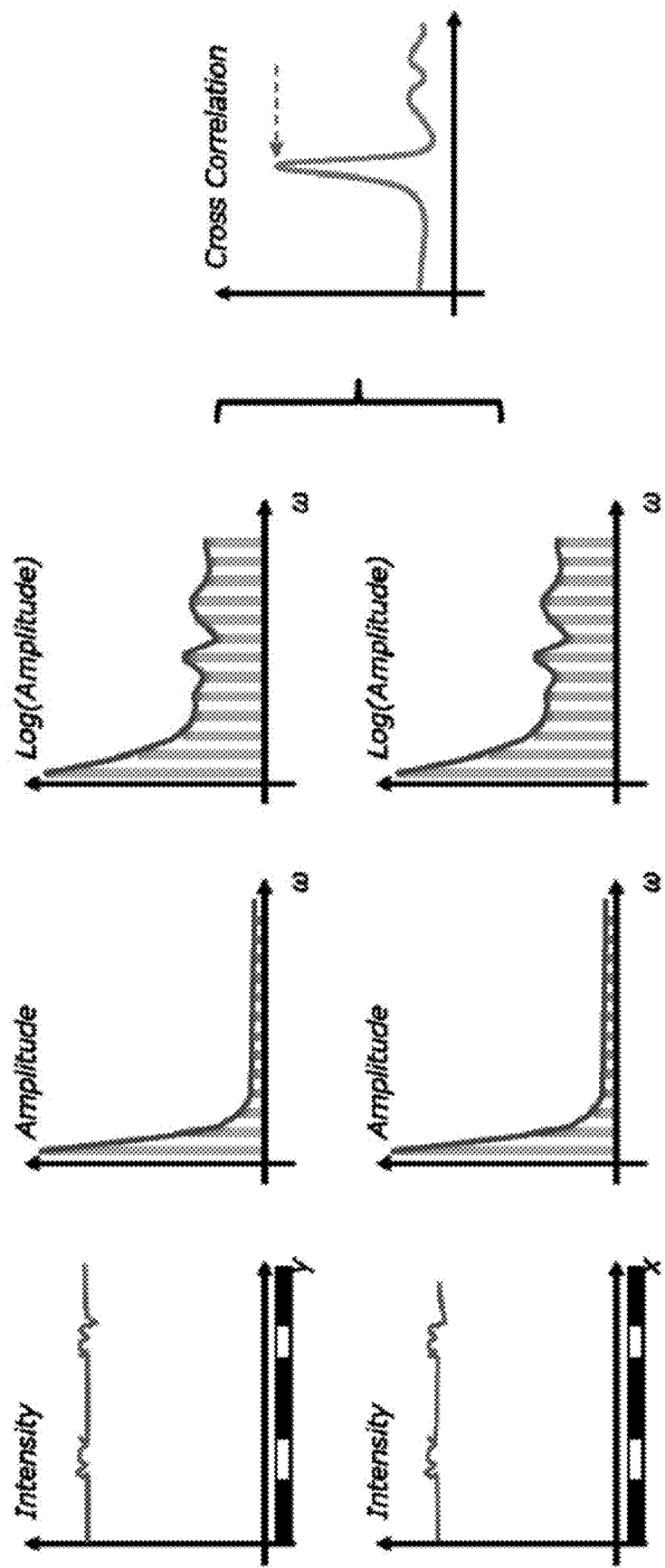
FIG. 10 is a schematic view for describing a masking method according to the present invention.

Subsequently, a method for estimating a brightness value according to the present invention will be described. FIG. 10 is a schematic view for describing a masking method according to the present invention. According to the present invention, a replacement value used in the masking process is determined based on the brightness value of a unique region so that the jump d is generated as less as possible. With this, unlike in the case of replacing a brightness value by the simple masking process, the value of the jump d becomes small, so that the influence of the Gibbs phenomenon is small. As a result, when a correlation calculation is performed between the first enhanced amplitude components and the second enhanced amplitude components, the maximum value of a cross-correlation function becomes a large value.

One example of a method for the replacement value estimation unit 121 to automatically determine a replacement value used for the masking process is a method of determining based on an effect of filtering on the amplitude components. As a specific example, it is assumed that the amplitude components are logarithmized. Since the energy of the signal is concentrated on the low-frequency components of the amplitude components and the low-frequency components have large values, the low-frequency components become insensitive to change in value when logarithmized. On the other hand, since the high-frequency components of the amplitude components have small values, the high-frequency components become more sensitive to change in value than the low-frequency components when logarithmized.

Figure 11:
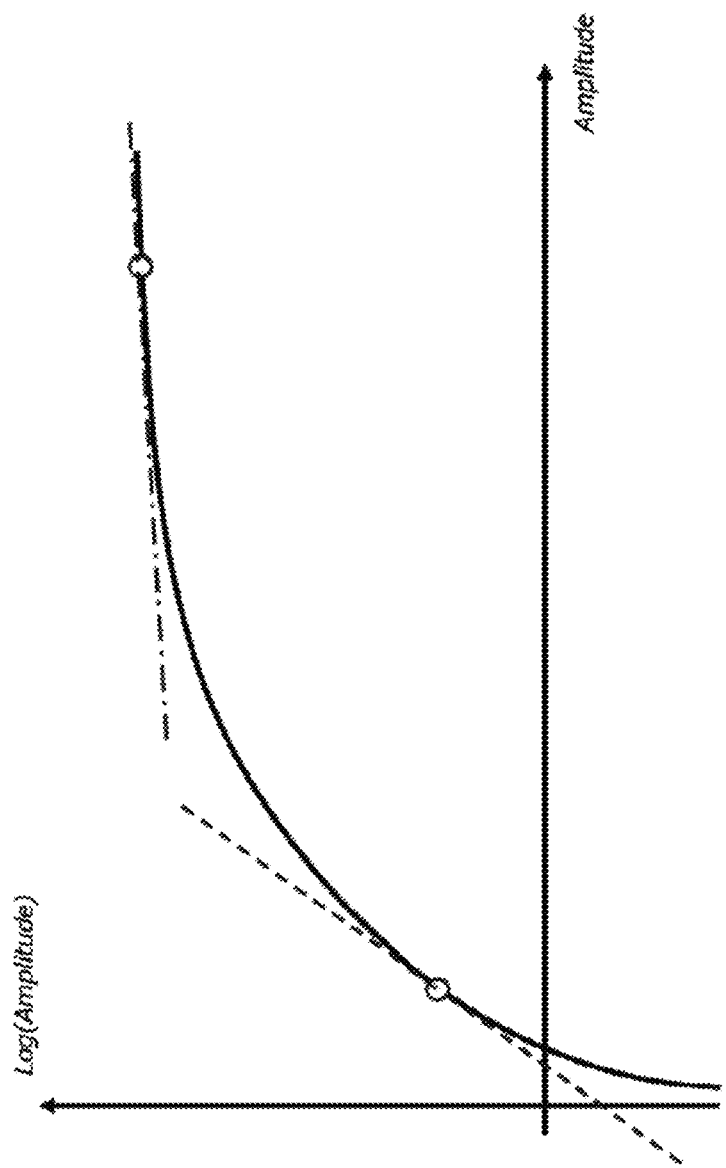
FIG. 11 is a graph for describing the relation between amplitude components and logarithmized amplitude components.

FIG. 11 is a graph for describing the relation between amplitude components and logarithmic amplitude components. As described above, the slope is small and insensitive to change when amplitude components have large values, and the slope is large and sensitive to change when amplitude components have small values. In other words, the low-frequency components of the amplitude components, even if the values are slightly changed, do not significantly affect the pattern of the enhanced amplitude components.

Based on the filtering effect by logarithmization, even when the brightness value of a profile is partially replaced and changed, if the change contributes only to low-frequency components of amplitude components, an influence on an enhanced amplitude component pattern is small. As a result, a high correlation value can be obtained when a correlation calculation is performed between the first enhanced amplitude components and the second enhanced amplitude components.

From the above viewpoint, the replacement value estimation unit 121 according to the present invention automatically determines a replacement value to be used for a masking process based on the pixel values of a unique region. For example, in a case where the average value of all the pixels of the unique region is calculated and the values of all the pixels of the common region are replaced with the calculated average value, the average pixel value of the unique region of the original image matches the average value of all the pixels of the replaced image. Therefore, when the pixel values are transformed into amplitude components, change due to the replacement contributes only to DC components of the amplitude components, that is, low-frequency components. Therefore, as described above, an enhanced amplitude component pattern is not significantly affected. Thus, a high correlation value can be obtained when a correlation calculation is performed between the first enhanced amplitude components and the second enhanced amplitude components.

Figure 12:
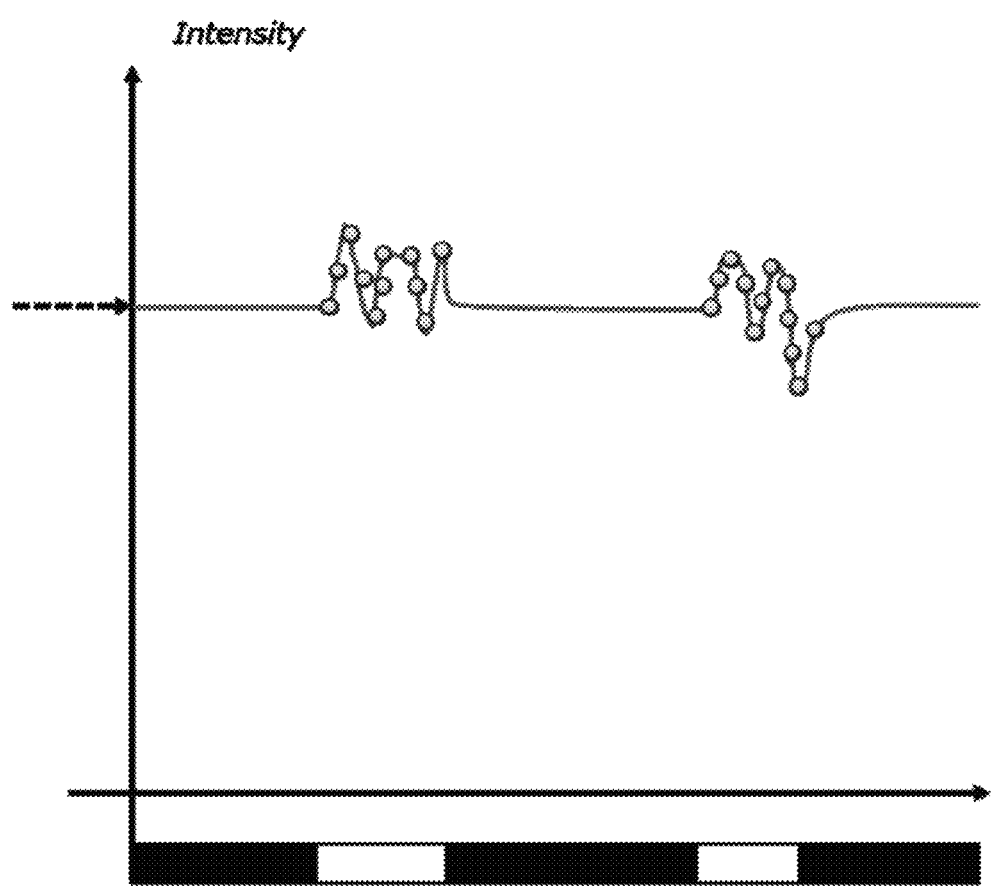
FIG. 12 is a graph showing an example of the result of replacing the pixel values of a common region with the average value of the pixel values of a unique region.

FIG. 12 is a graph showing a replacement result image by the abovementioned replacement method. The circles in FIG. 12 indicate the values of the pixels of the unique region. The arrow with broken line shown on the left side of the vertical axis indicates the average pixel value of the unique region. Since the values of the pixels of the common region are set to be the same as the average pixel value of the unique region, the level of the jump d, which may be caused at the boundary between the common region and the unique region, can be suppressed as compared with when a fixed value (for example, 0) is used, so that a high correlation value can be obtained.

Another example of the method for automatically determining the replacement value used for the masking process is a method of, with reference to the value of a pixel of the unique region to be the boundary between the unique region and the common region (a boundary pixel), estimating the replacement value based on the value of the pixel and using the replacement value for the replacement of the common region. It is possible to, for example, execute differential processing on the mask image and use a non-zero element as the boundary pixel. In addition to this, it is possible to obtain an erosion mask image by performing a spatial erosion process on the mask image, and it is possible to take the difference between the mask image and the erosion mask image to extract only the boundary pixel.

In a common region surrounded by a unique region, or in a common region in two dimensions, a plurality of boundary pixels exist. In such a case, for example, all the pixels of the common region may be replaced by using the average or the median of the values of the plurality of boundary pixels. Instead of replacing all the pixels of the common region with the same value, the respective pixels of the common region may be replaced by, based on the result of the plurality of boundary pixels, replacing the pixels of the common region adjacent to the boundary pixels, and sequentially repeating the same process by using the replaced and updated pixels as new boundary pixels.

The replacement value estimation unit 121 estimates brightness values for the first image and the second image, respectively, as described above. The estimated brightness values are referred to as a first estimated brightness value and a second estimated brightness value, respectively.

The pixel value replacement processing unit 122 is configured to be able to acquire the first estimated brightness value and the second estimated brightness value. The pixel value replacement processing unit 122 replaces the values of the pixels of the common region of the first image with the first estimated brightness value. Moreover, the pixel value replacement processing unit 122 replaces the values of the pixels of the common region of the second image with the second estimated brightness value.

As described above, the data replacement unit 102 generates the first replaced image so that the difference between the brightness value of the pixel of the common region and the brightness value of the pixel of a region different from the common region in the first replaced image is smaller than the difference between the brightness value of the pixel of the common region and the brightness value of the pixel of a region different from the common region in the first image. Likewise, the data replacement unit 102 generates the second replaced image so that the difference between the brightness value of the pixel of the common region and the brightness value of the pixel of a region different from the common region in the second replaced image is smaller than the difference between the brightness value of the pixel of the common region and the brightness value of the pixel of a region different from the common region in the second image.

Furthermore, in other words, the data replacement unit 102 generates the first replaced image so that, when the amplitude components of the first image and the amplitude components of the first replaced image are subjected to the amplitude enhancement process, respectively, change is less likely to occur between the enhanced amplitude components of the first image and the enhanced amplitude components of the first replaced image. Likewise, the data replacement unit 102 generates the second replaced image so that, when the amplitude components of the second image and the amplitude components of the second replaced image are subjected to the amplitude enhancement process, respectively, change is less likely to occur between the enhanced amplitude components of the second image and the enhanced amplitude components of the second replaced image.

Figure 13:
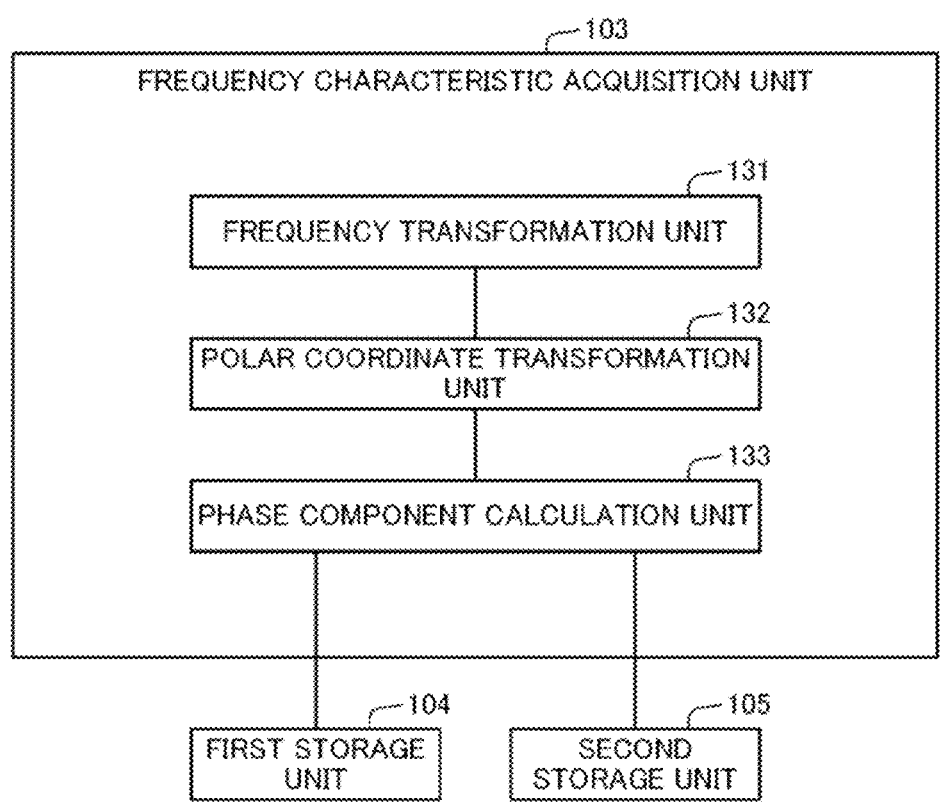
FIG. 13 is a block diagram showing an example of a frequency characteristic acquisition unit in the image matching apparatus according to the first example embodiment of the present invention.

Next, the frequency characteristic acquisition unit 103 will be described in detail. FIG. 13 is a block diagram showing an example of the frequency characteristic acquisition unit 103. The frequency characteristic acquisition unit 103 in this example includes a frequency transformation unit 131, a polar coordinate transformation unit 132, and a phase component calculation unit 133.

First, in order to explain an amplitude component and a phase component, the discrete Fourier transform will be explained. It is assumed that the first image and the second image are two images $f(n1, n2)$ and $g(n1, n2)$ of $N1 \times N2$ pixels. Moreover, it is assumed that the discrete space indexes (integer) of a two-dimensional image signal are $n1=-M1, \ldots, M1$ and $n2=-M2, \ldots, M2$. Herein, M1 and M2 are positive integers, and $N1=2M1+1$ and $N2=2M2+1$. Then, a first frequency characteristic $F(k1, k2)$ obtained by the two-dimensional discrete Fourier transform of the image $f(n1, n2)$ and a second frequency characteristic $G(k1, k2)$ obtained by the two-dimensional discrete Fourier transform of the image $g(n1, n2)$ are given by Equations 1 and 2 shown in FIG. 14. In Equations 1 and 2, $k1=-M1, \ldots, M1$ and $k2=-M2, \ldots, M2$ are discrete frequency indexes (integer). Moreover, WN1 and WN2 are twiddle factors and are given by Equations 3 and 4 shown in FIG. 14. Moreover, AF (k1, k2) and AG (k1, k2) represent amplitude spectrums (amplitude components), and OF (k1, k2) and θG (k1, k2) represent phase spectrums (phase components), respectively. Moreover, Σn1, n2 represent addition over all the indexes as shown in Equation 5 of FIG. 14.

Subsequently, the respective units composing the frequency characteristic acquisition unit 103 will be described. The frequency transformation unit 131 is configured to receive the first replaced image and the second replaced image from the data replacement unit 102, perform the discrete Fourier transform of each of the images, and calculate amplitude components from the result. The amplitude components are invariant to the translation of the original image. Moreover, the frequency transformation unit 131 transforms the amplitude components into enhanced amplitude components by the filtering process as described above.

The polar coordinate transformation unit 132 is configured to receive the first enhanced amplitude components and the second enhanced amplitude components from the frequency transformation unit 131, perform the logarithmic polar coordinate transformation on them, and calculate polar coordinate images. The polar coordinate images are called Fourier-Mellin characteristic images. Change in magnification and rotation of the original image is transformed into change in translation in the Fourier-Mellin characteristic image.

The phase component calculation unit 133 is configured to receive the Fourier-Mellin characteristic image of the first image and the Fourier-Mellin characteristic image of the second image from the polar coordinate transformation unit 132, and perform the discrete Fourier transform of them to calculate phase components. The phase components are called Fourier-Mellin phase characteristics. The phase component calculation unit 133 stores the Fourier-Mellin phase characteristic of the first image into the first storage unit 104, and stores the Fourier-Mellin phase characteristic of the second image into the second storage unit 105.

Next, the matching determination unit 106 will be described in detail. The matching determination unit 106 is configured to calculate a matching score by a correlation calculation using the frequency characteristic of the first image stored in the first storage unit 104 and the frequency characteristic of the second image stored in the second storage unit 105, and determine the result of matching based on the matching score.

As a method for calculating the matching score between the frequency characteristics, for example, the method described in Non-Patent Document 1 can be used. As another method for calculating the matching score, for example, the method described in Non-Patent Document 2 can be used.

Thus, the image matching apparatus 100 according to this example embodiment can perform robust matching between objects having a common region even when performing fast matching by the amplitude correlation based method. The reason is that the image matching apparatus 100 according to this example embodiment acquires a common region in each of a first image and a second image, generates a first replaced image and a second replaced image by replacing the brightness value of the common region based on the value of a unique region so that frequency components used for matching are not affected when the images are transformed into amplitude components by the Fourier transform, and perform matching by an amplitude correlation based method in which the first replaced image and the second replaced image are transformed into frequency characteristics.

In an environment where there is no variation in scale and rotation in the unique regions of the first image and the second image, the polar coordinate transformation unit 132 of FIG. 13 may be omitted. In the image matching apparatus in which the polar coordinate transformation unit 132 is omitted, the frequency transformation unit 133 is configured to receive the amplitude components of the first image and the amplitude components of the second image from the frequency transformation unit 131, and store phase images as the result of the discrete Fourier transform of the amplitude components into the first storage unit 104 and the second storage unit 105.

Second Example Embodiment

Next, an image matching apparatus according to a second example embodiment of the present invention will be described. An image matching apparatus 300 according to this example embodiment is different from the image matching apparatus according to the first example embodiment in the common region acquisition unit 101, and otherwise the same as the image matching apparatus according to the first example embodiment.

Figure 15:
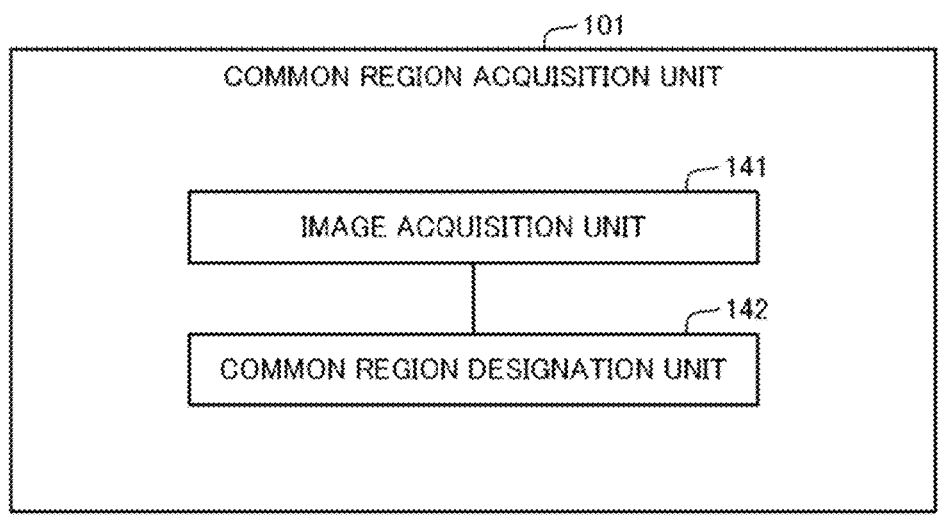
FIG. 15 is a block diagram of a common region acquisition unit in an image matching apparatus according to a second example embodiment of the present invention.

FIG. 15 is a block diagram of the common region acquisition unit 101 in the image matching apparatus 300 according to this example embodiment. The common region acquisition unit 101 in this example includes an image acquisition unit 141 and a common region designation unit 142.

The image acquisition unit 141 is configured to acquire a first image and a second image in the same manner as the image acquisition unit 111 shown in FIG. 5.

The common region designation unit 142 is configured to receive the first image and the second image from the image acquisition unit 141, store pixels corresponding to a common region in accordance with an indication from the user, and output a mask image for showing the common region. The common region designation unit 142 is configured to be able to display the received images, the mask image, and a composite image made up based on the received images and the mask image on the screen display unit 203.

The abovementioned indication from the user is information input from the operation input unit 202 into the common region designation unit 142 in the image matching apparatus according to this example embodiment. For example, the user uses the operation input unit 202 to indicate with respect to each pixel in the first image or the second image received by the common region designation unit 142 whether to be a common region or a unique region. The user can indicate whether to be a common region or a unique region while checking the images, the mask image, and the composite image displayed on the screen display unit 203.

The common region designation unit 142 may automatically determine values of part of the mask image and update the values in response to the indication from the user. Consequently, the user does not need to indicate with respect to all the pixels of the image whether to be the common region or the unique region. For example, by a technique called GraphCut, the common region designation unit 142 can update the values of pixels of the mask image that have not been determined whether to be the common region or the unique region by referring to the images and the mask image and using information on pixels that have been determined whether to be the common region or the unique region and pixels in the vicinity thereof.

The common region designation unit 142 may display a mask image generated with the result of indication from the user reflected on the screen display unit 203. Moreover, in order to increase visibility to the user, the common region designation unit 142 may display a composite image. As a method for generating a composite image, for example, alpha blending can be used. By preparing an image for composite in which the pixels determined to be the unique region based on the mask image are blue and the pixels determined to be the common region are red, and performing alpha blending of the image and the image for composite, the user can visually recognize with ease whether each pixel of the image is the unique region or the common region.

According to the image matching apparatus according to this example embodiment, for the same reason as in the image matching apparatus according to the first example embodiment, it is possible to perform robust matching between objects having a common region even when performing fast matching by the amplitude correlation based method. Moreover, the user can indicate designation of the common region or the unique region. Therefore, in such a case where the common region acquisition unit 112 of the image matching apparatus according to the first example embodiment makes a wrong determination of the unique region or the common region, it is possible to output a correct mask image. As a result, it is possible to perform robust matching between objects having a common region even when performing fast matching by the amplitude correlation based method.

Third Example Embodiment

Figure 16:
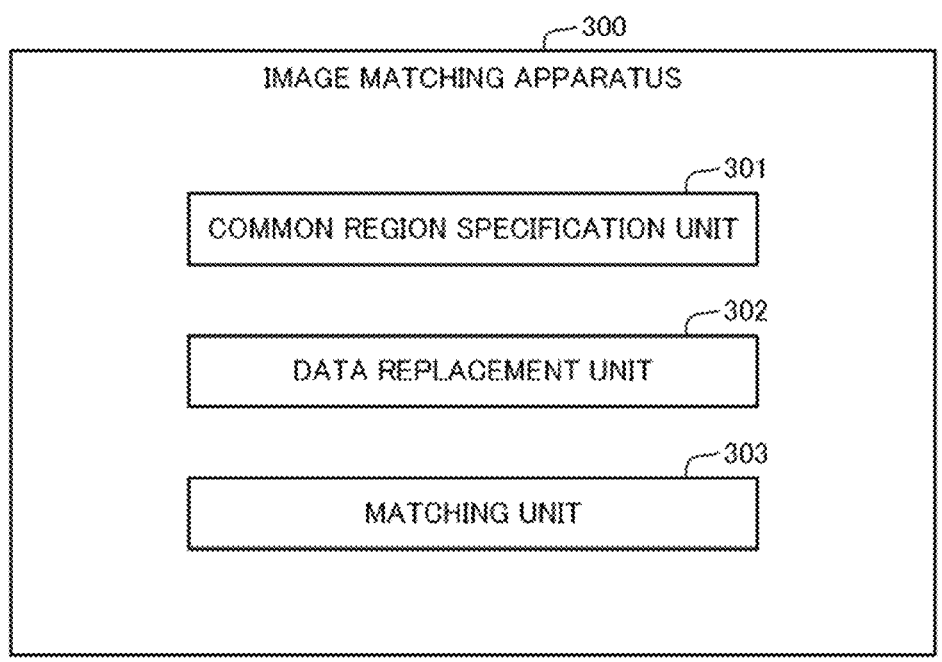
FIG. 16 is a view showing the configuration of an image matching apparatus according to a third example embodiment of the present invention.

Next, an image matching apparatus according to a third example embodiment of the present invention will be described. FIG. 16 is a block diagram showing the configuration of the image matching apparatus according to the third example embodiment. In this example embodiment, the overview of the configuration of the image matching apparatus described in the first example embodiment is shown.

As shown in FIG. 16, an image matching apparatus 300 according to this example embodiment includes: a common region specification unit 301 configured to specify a common region between a first image and a second image; a date replacement unit 302 configured to generate a first replaced image in which a brightness value of the common region of the first image is replaced based on pixels in the first image, and a second replaced image in which a brightness value of the common region of the second image is replaced based on pixels in the second image; and a matching unit 303 configured to perform matching between the first image and the second image based on frequency characteristics of the first replaced image and the second replaced image.

The common region specification unit 301, the data replacement unit 302, and the matching unit 303 described above may be structured by execution of a program by an arithmetic logic unit installed in an information processing apparatus forming the image matching apparatus 300, or may be structured by an electronic circuit.

Then, the image matching apparatus 300 with the above configuration operates so as to execute processes to: specify a common region between a first image and a second image; generate a first replaced image in which a brightness value of the common region of the first image is replaced based on pixels in the first image, and a second replaced image in which a brightness value of the common region of the second image is replaced based on pixels in the second image; and perform matching between the first image and the second image based on frequency characteristics of the first replaced image and the second replaced image.

According to the abovementioned invention, the brightness value of the common region between the first image and the second image is specified and replaced based on the pixels in each of the images, specifically, based on the pixels of a unique region that is different from the common region in each of the images. Therefore, when performing matching between the first image and the second image based on the frequency characteristics of the first replaced image and the second replaced image, it is possible to suppress an influence of frequency components to be used for matching. As a result, it is possible to perform robust matching even when performing fast matching by the amplitude correlation based method.

INDUSTRIAL APPLICABILITY

The present invention can be utilized in the field of performing matching between two images, specifically, can be utilized in the field of acquiring the difference in spontaneous fine patterns generated in the same manufacturing process, such as fine irregularities or patterns on a product surface or random patterns on a product surface, as an image by an imaging device such as a camera, recognizing the fine patterns, and thereby performing individual identification and management of an individual product.

SUPPLEMENTARY NOTES

The whole or part of the example embodiments disclosed above can be described as the following supplementary notes. Below, the overview of the configurations of an image matching apparatus, an image matching method, and a program according to the present invention will be described. However, the present invention is not limited to the following configurations.

Supplementary Note 1

An image matching apparatus comprising:
a common region specification unit configured to specify a common region between a first image and a second image;
a date replacement unit configured to generate a first replaced image and a second replaced image, the first replaced image being an image in which a brightness value of the common region of the first image is replaced based on a pixel in the first image, the second replaced image being an image in which a brightness value of the common region of the second image is replaced based on a pixel in the second image; and
a matching unit configured to perform matching between the first image and the second image based on frequency characteristics of the first replaced image and the second replaced image.

Supplementary Note 2

The image matching apparatus according to Supplementary Note 1, wherein the data replacement unit is configured to generate the first replaced image in which the brightness value of the common region of the first image is replaced based on a pixel of a region different from the common region of the first image, and generate the second replaced image in which the brightness value of the common region of the second image is replaced based on a pixel of a region different from the common region of the second image.

Supplementary Note 3

The image matching apparatus according to Supplementary Note 2, wherein the data replacement unit is configured to generate the first replaced image in which the brightness value of the common region of the first image is replaced based on a brightness value of the pixel of the region different from the common region of the first image, and generate the second replaced image in which the brightness value of the common region of the second image is replaced based on a brightness value of the pixel of the region different from the common region of the second image.

Supplementary Note 4

The image matching apparatus according to Supplementary Note 3, wherein the data replacement unit is configured to generate the first replaced image in which the brightness value of the common region of the first image is replaced with a value calculated based on brightness values of all pixels of the region different from the common region of the first image, and generate the second replaced image in which the brightness value of the common region of the second image is replaced with a value calculated based on brightness values of all pixels of the region different from the common region of the second image.

Supplementary Note 5

The image matching apparatus according to Supplementary Note 4, wherein the data replacement unit is configured to:
generate the first replaced image so that a difference between a brightness value of a pixel of the common region and a brightness value of a pixel of the region different from the common region in the first replaced image is smaller than a difference between a brightness value of a pixel of the common region and a brightness value of a pixel of the region different from the common region in the first image; and
generate the second replaced image so that a difference between a brightness value of a pixel of the common region and a brightness value of a pixel of the region different from the common region in the second replaced image is smaller than a difference between a brightness value of a pixel of the common region and a brightness value of a pixel of the region different from the common region in the second image;

Supplementary Note 6

The image matching apparatus according to Supplementary Note 4 or 5, wherein the data replacement unit is configured to:
generate the first replaced image so that, in a case where an amplitude enhancement process is performed on an amplitude component of the first image and an amplitude component of the first replaced image, respectively, a change is hard to occur between an enhanced amplitude component of the first image and an enhanced amplitude component of the first replaced image; and generate the second replaced image so that, in a case where an amplitude enhancement process is performed on an amplitude component of the second image and an amplitude component of the second replaced image, respectively, a change is hard to occur between an enhanced amplitude component of the second image and an enhanced amplitude component of the second replaced image.

Supplementary Note 7

The image matching apparatus according to any of Supplementary Notes 4 to 6, wherein the data replacement unit is configured to generate the first replaced image in which the brightness value of the common region of the first image is replaced with a value obtained by averaging the brightness values of all the pixels of the region different from the common region of the first image, and generate the second replaced image in which the brightness value of the common region of the second image is replaced with a value obtained by averaging the brightness values of all the pixels of the region different from the common region of the second image.

Supplementary Note 8

The image matching apparatus according to any of Supplementary Notes 1 to 7, wherein the matching unit is configured to perform matching between the first image and the second image by performing Fourier transform of the first replaced image and the second replaced image and performing a predetermined correlation calculation between amplitude components.

Supplementary Note 9

A computer program comprising instructions for causing an image information apparatus to realize:
a common region specification unit configured to specify a common region between a first image and a second image;
a date replacement unit configured to generate a first replaced image and a second image, the first image being an image in which a brightness value of the common region of the first image is replaced based on pixels in the first image, the second replaced image being an image in which a brightness value of the common region of the second image is replaced based on pixels in the second image; and
a matching unit configured to perform matching between the first image and the second image based on frequency characteristics of the first replaced image and the second replaced image.

Supplementary Note 10

An image matching method comprising:
specifying a common region between a first image and a second image;
generating a first replaced image and a second image, the first image being an image in which a brightness value of the common region of the first image is replaced based on pixels in the first image, the second replaced image being an image in which a brightness value of the common region of the second image is replaced based on pixels in the second image; and
performing matching between the first image and the second image based on frequency characteristics of the first replaced image and the second replaced image.

Supplementary Note 11

The image matching method according to Supplementary Note 10, comprising:
generating the first replaced image in which the brightness value of the common region of the first image is replaced based on a pixel of a region different from the common region of the first image; and
generating the second replaced image in which the brightness value of the common region of the second image is replaced based on a pixel of a region different from the common region of the second image.

Supplementary Note 12

The image matching method according to Supplementary Note 11, comprising:
generating the first replaced image in which the brightness value of the common region of the first image is replaced based on a brightness value of the pixel of the region different from the common region of the first image; and
generating the second replaced image in which the brightness value of the common region of the second image is replaced based on a brightness value of the pixel of the region different from the common region of the second image.

Supplementary Note 13

The image matching method according to Supplementary Note 12, comprising:
generating the first replaced image in which the brightness value of the common region of the first image is replaced with a value calculated based on brightness values of all pixels of the region different from the common region of the first image; and
generating the second replaced image in which the brightness value of the common region of the second image is replaced with a value calculated based on brightness values of all pixels of the region different from the common region of the second image.

Supplementary Note 14

The image matching method according to Supplementary Note 13, comprising:
generating the first replaced image so that a difference between a brightness value of a pixel of the common region and a brightness value of a pixel of the region different from the common region in the first replaced image is smaller than a difference between a brightness value of a pixel of the common region and a brightness value of a pixel of the region different from the common region in the first image; and
generating the second replaced image so that a difference between a brightness value of a pixel of the common region and a brightness value of a pixel of the region different from the common region in the second replaced image is smaller than a difference between a brightness value of a pixel of the common region and a brightness value of a pixel of the region different from the common region in the second image;

Supplementary Note 15

The image matching method according to Supplementary Note 13 or 14, comprising:
generating the first replaced image so that, in a case where an amplitude enhancement process is performed on an amplitude component of the first image and an amplitude component of the first replaced image, respectively, a change is hard to occur between an enhanced amplitude component of the first image and an enhanced amplitude component of the first replaced image; and generating the second replaced image so that, in a case where an amplitude enhancement process is performed on an amplitude component of the second image and an amplitude component of the second replaced image, respectively, a change is hard to occur between an enhanced amplitude component of the second image and an enhanced amplitude component of the second replaced image.

Supplementary Note 16

The image matching method according to any of Supplementary Notes 13 to 15, comprising:

generating the first replaced image in which the brightness value of the common region of the first image is replaced with a value obtained by averaging the brightness values of all the pixels of the region different from the common region of the first image; and generating the second replaced image in which the brightness value of the common region of the second image is replaced with a value obtained by averaging the brightness values of all the pixels of the region different from the common region of the second image.

Supplementary Note 17

The image matching method according to any of Supplementary Notes 10 to 16, comprising:

performing matching between the first image and the second image by performing Fourier transform of the first replaced image and the second replaced image and performing a predetermined correlation calculation between amplitude components.

The abovementioned program can be stored using various types of non-transitory computer-readable mediums and supplied to a computer. The non-transitory computer-readable mediums include various types of tangible storage mediums. Examples of the non-transitory computer-readable mediums include a magnetic recording medium (for example, a flexible disk, a magnetic tape, a hard disk drive), a magnetooptical recording medium (for example, a magnetooptical disk), a CD-ROM (Read Only Memory), a CD-R, a CD-R/W, a semiconductor memory (for example, a mask ROM, a PROM (Programmable ROM), an EPROM (Erasable PROM), a flash ROM, and a RAM (Random Access Memory). The program may be supplied to a computer by various types of transitory computer-readable mediums. Examples of the transitory computer-readable mediums include an electric signal, an optical signal, and an electromagnetic wave. The transitory computer-readable medium can supply the program to a computer via a wired communication channel such as an electric wire and an optical fiber, or a wireless communication channel.

Although the present invention has been described above with reference to the above example embodiments and so on, the present invention is not limited to the above example embodiments. The configurations and details of the present invention can be changed in various manners that can be understood by one skilled in the art within the scope of the present invention.

DESCRIPTION OF NUMERALS

100 image matching apparatus
101 common region acquisition unit
102 data replacement unit
103 frequency characteristic acquisition unit
104 first storage unit
105 second storage unit
106 matching determination unit
107 information presentation unit
111 image acquisition unit
112 common region determination unit
121 replacement value estimation unit
122 pixel value replacement processing unit
131 frequency transformation unit
132 polar coordinate transformation unit
133 phase component calculation unit
141 image acquisition unit
142 common region designation unit
200 information processing apparatus
201 imaging unit
202 operation input unit
203 image display unit
204 communication interface unit
206 arithmetic logic unit
207 storage unit
300 image matching apparatus
301 common region specification unit
302 data replacement unit
303 matching unit

What is claimed is:

1. An image matching apparatus comprising:
a memory for storing instructions; and
at least one processor configured to execute the instructions to:
specify a common region between a first image and a second image;
generate a first replaced image in which a brightness value of the common region is replaced in the first image based on a pixel of a first region in the first image different than the common region;
generate a second replaced image in which a brightness value of the common region is replaced in the second image based on a pixel of a second region in the second image different than the common region; and
perform matching between the first image and the second image based on frequency characteristics of the first replaced image and the second replaced image.

2. The image matching apparatus according to claim 1, wherein the at least one processor is configure to execute the instructions to further:
generate the first replaced image in which the brightness value of the common region is replaced in the first image based on a brightness value of the pixel of the first region in the first image different than the common region; and
generate the second replaced image in which the brightness value of the common region of the second image is replaced based on a brightness value of the pixel of the second region in the second image different than the common region.

3. The image matching apparatus according to claim 2, wherein the at least one processor is configure to execute the instructions to further:
generate the first replaced image in which the brightness value of the common region is replaced in the first image with a first value calculated based on brightness values of all pixels of the first region different from the common region; and
generate the second replaced image in which the brightness value of the common region is replaced in the second image with a second value calculated based on brightness values of all pixels of the second region different from the common region.

4. The image matching apparatus according to claim 3, wherein the at least one processor is configure to execute the instructions to further:

generate the first replaced image so that a difference between a brightness value of a pixel of the common region in the first image and a brightness value of a pixel of the first region different from the common region in the first replaced image is smaller than a difference between a brightness value of a pixel of the common region in the first image and a brightness value of a pixel of the first region different from the common region in the first image; and generate the second replaced image so that a difference between a brightness value of a pixel of the common region in the second image and a brightness value of a pixel of the second region different from the common region in the second replaced image is smaller than a difference between a brightness value of a pixel of the common region in the second image and a brightness value of a pixel of the second region different from the common region in the second image.

5. The image matching apparatus according to claim 3, wherein the at least one processor is configure to execute the instructions to further:

generate the first replaced image so that, in a case in which an amplitude enhancement process is performed on an amplitude component of the first image and an amplitude component of the first replaced image, an enhanced amplitude component of the first image matches an enhanced amplitude component of the first replaced image; and generate the second replaced image so that, in a case in which an amplitude enhancement process is performed on an amplitude component of the second image and an amplitude component of the second replaced image, an enhanced amplitude component of the second image matches an enhanced amplitude component of the second replaced image.

6. The image matching apparatus according to claim 3, wherein the at least one processor is configure to execute the instructions to further:

generate the first replaced image such that the brightness value of the common region is replaced in the first image with a value obtained by averaging the brightness values of all the pixels of the first region different from the common region in the first image; and generate the second replaced image such that the brightness value of the common region is replaced in the second image with a value obtained by averaging the brightness values of all the pixels of the second region different from the common region in the second image.

7. The image matching apparatus according to claim 1, wherein the at least one processor is configure to execute the instructions to further:

perform matching between the first image and the second image by performing a Fourier transform of the first replaced image and the second replaced image and by performing a predetermined correlation calculation between amplitude components of the first replaced image and the second replaced image.

8. A non-transitory computer-readable storage medium on which a computer program is stored, the computer program that when executed causes an image information apparatus to:

specify a common region between a first image and a second image;

generate a first replaced image in which a brightness value of the common region is replaced in the first image based on a pixel of a first region in the first image different than the common region;

generate a second replaced image in which a brightness value of the common region is replaced in the second image based on a pixel of a second region in the second image different than the common region; and perform matching between the first image and the second image based on frequency characteristics of the first replaced image and the second replaced image.

9. An image matching method comprising:

specifying, by a processor, a common region between a first image and a second image;

generating, by the processor, a first replaced image in which a brightness value of the common region is replaced in the first image based on a pixel of a first region in the first image different than the common region;

generating, by the processor, a second replaced image in which a brightness value of the common region is replaced in the second image based on a pixel of a second region in the second image different than the common region; and performing, by the processor, matching between the first image and the second image based on frequency characteristics of the first replaced image and the second replaced image.

10. The image matching method according to claim 9, further comprising:

generating, by the processor, the first replaced image in which the brightness value of the common region is replaced in the first image based on a brightness value of the pixel of the first region in the first image different than the common region; and generating, by the processor, the second replaced image in which the brightness value of the common region of the second image is replaced based on a brightness value of the pixel of the second region in the second image different than the common region.

11. The image matching method according to claim 10, further comprising:

generating, by the processor, the first replaced image in which the brightness value of the common region is replaced in the first image with a first value calculated based on brightness values of all pixels of the first region different from the common region; and generating, by the processor, the second replaced image in which the brightness value of the common region is replaced in the second image with a second value calculated based on brightness values of all pixels of the second region different from the common region.

12. The image matching method according to claim 11, further comprising:

generating, by the processor, the first replaced image so that a difference between a brightness value of a pixel of the common region in the first image and a brightness value of a pixel of the first region different from the common region in the first replaced image is smaller than a difference between a brightness value of a pixel of the common region in the first image and a brightness value of a pixel of the first region different from the common region in the first image; and generating, by the processor, the second replaced image so that a difference between a brightness value of a pixel of the common region in the second image and a brightness value of a pixel of the second region different from the common region in the second replaced image is smaller than a difference between a brightness value of a pixel of the common region in the second image and a brightness value of a pixel of the second region different from the common region in the second image.

13. The image matching method according to claim 11, further comprising:
   generating, by the processor, the first replaced image so that, in a case in which an amplitude enhancement process is performed on an amplitude component of the first image and an amplitude component of the first replaced image, an enhanced amplitude component of the first image matches an enhanced amplitude component of the first replaced image; and
   generating, by the processor, the second replaced image so that, in a case in which an amplitude enhancement process is performed on an amplitude component of the second image and an amplitude component of the second replaced image, an enhanced amplitude component of the second image matches an enhanced amplitude component of the second replaced image.

14. The image matching method according to claim 11, further comprising:
   generating, by the processor, the first replaced image such that the brightness value of the common region is replaced in the first image with a value obtained by averaging the brightness values of all the pixels of the first region different from the common region in the first image; and
   generating, by the processor, the second replaced image such that the brightness value of the common region is replaced in the second image with a value obtained by averaging the brightness values of all the pixels of the second region different from the common region in the second image.

15. The image matching method according to claim 9, further comprising:
   performing, by the processor, matching between the first image and the second image by performing a Fourier transform of the first replaced image and the second replaced image and by performing a predetermined correlation calculation between amplitude components of the first replaced image and the second replaced image.

* * * * *